United States Patent [19]

Margraf

[11] Patent Number: 4,827,106
[45] Date of Patent: May 2, 1989

[54] SELF-CLEANING CONVECTION OVEN

[75] Inventor: Dallas A. Margraf, Spring Valley, Ohio

[73] Assignee: Hobart Corporation, Troy, Ohio

[21] Appl. No.: 99,426

[22] Filed: Sep. 21, 1987

[51] Int. Cl.⁴ .......................... A21B 1/26; F27D 7/04
[52] U.S. Cl. .................................... 219/389; 219/388; 219/400
[58] Field of Search ............... 219/389, 400, 388; 432/106, 108, 117, 118; 126/21 A, 21 R

[56] References Cited

U.S. PATENT DOCUMENTS

| | | | |
|---|---|---|---|
| 718,135 | 1/1903 | Lester | 219/389 |
| 1,677,651 | 7/1928 | Noonan | 219/389 |
| 1,697,268 | 1/1929 | Evesmith | 432/108 |
| 1,820,938 | 9/1931 | Clandrow | 219/389 |
| 2,354,100 | 7/1944 | Bowen | 219/389 |
| 2,412,133 | 12/1946 | Doyle | 432/108 |
| 2,787,841 | 4/1957 | Warino | 34/58 |
| 2,939,383 | 6/1960 | Kanaga | 219/389 |
| 3,228,670 | 1/1966 | Moklebust | 432/108 |
| 3,555,992 | 1/1971 | Fritzberg | 99/345 |
| 3,807,292 | 4/1974 | Cinger | 99/348 |
| 3,870,193 | 3/1975 | Schneider | 221/150 A |
| 4,048,473 | 9/1977 | Burkhart | 219/389 |
| 4,068,572 | 1/1978 | Vogt | 99/448 |
| 4,155,294 | 5/1979 | Langhammer et al. | 99/427 |
| 4,203,358 | 5/1980 | Vogt | 99/352 |
| 4,295,419 | 10/1981 | Langhammer | 219/389 |
| 4,304,177 | 12/1981 | Loeffler et al. | 99/333 |
| 4,374,318 | 2/1983 | Gilliom | 219/400 |
| 4,503,760 | 3/1985 | Pryputsch et al. | 99/447 |
| 4,592,150 | 6/1986 | Schnupp | 432/108 |
| 4,601,279 | 7/1986 | Guerin | . |
| 4,648,377 | 3/1987 | Van Camp | 126/21 A |
| 4,657,771 | 4/1987 | Gould | 426/641 |
| 4,665,956 | 5/1987 | Freeman | 141/5 |

FOREIGN PATENT DOCUMENTS

| | | |
|---|---|---|
| 1679267 | 8/1967 | Fed. Rep. of Germany . |
| 2541718 | 9/1975 | Fed. Rep. of Germany . |
| 574847 | 7/1924 | France ........... 432/108 |
| 654378 | 6/1963 | Italy ............. 219/389 |

OTHER PUBLICATIONS

Advertising Brochure, "Roll-A-Fryer", May 1984, John J. Connolly, Co.
Rair Rotating Air Cooking, Rair Products of OXio 1983.
Automatic Breading Machine, Henny Penny Corp. 11/86.

Primary Examiner—Teresa J. Walberg
Attorney, Agent, or Firm—Biebel, French & Nauman

[57] ABSTRACT

A self-cleaning continuous cooking oven is provided which is capable of rapidly cooking different foodstuffs with a recirculated hot air. The oven has a cabinet defining said oven cavity, an inlet chute for food portions to be cooked, and an outlet chute for cooked food portions. These chutes may be sealed during an oven cleaning cycle. Within the cavity there is a rotatable cooking chamber including a cylindrical wall having a longitudinal axis and having an inlet end and an outlet end. A conveying member extends along and projects inward from the interior of the cylindrical wall defining a food carrying passage extending to the outlet end of said cooking chamber, and food passed into the inlet chute progresses through the chamber and exits via the outlet chute means rotatably supporting said cooking chamber in said oven cavity with said inlet end adjacent said inlet chute and said outlet end discharging to said outlet chute. A recirculating blower and a heater supplies a forced flow of heated air into said cooking chamber and onto food portions therein, and a drive rotates the cooking chamber at a predetermined speed. A cycle control operates the oven in cooking and self-cleaning modes. In the self-cleaning mode the heater is operated at a temperature sufficiently high to assure pyrolytic cleaning of soil from interior exposed parts of the oven cavity and the cooking chamber, and also actuates the drive for the cooking chamber during a cleaning mode.

4 Claims, 7 Drawing Sheets

SELF-CLEANING CONVECTION OVEN

CROSS REFERENCE TO RELATED APPLICATION

This application is related to subject matter disclosed and claimed in copending U.S. patent application Ser. No. 099,421 filed of even date with this application and assigned to the same assignee.

BACKGROUND OF THE INVENTION

This invention relates to cooking ovens, particularly of the convection type wherein heated air is circulated through an oven cavity to produce rapid even cooking and/or baking, and specifically to a provision for pyrolytic self-cleaning in such ovens. In a specific embodiment, the invention also relates to self-cleaning of a conveyor-type continuous oven. No practical self-cleaning convection continuous cooking type ovens are commercially available. However, a self-cleaning feature is particularly desirable where such ovens are used in busy restaurant kitchens for long hours of service, for example as are typical in fast-food restaurants which may operate from eighteen to twenty-four hours a day, and may use the oven to prepare a variety of quite different products during such a period.

SUMMARY OF THE INVENTION

The invention relates to and provides a cooking oven capable of rapidly cooking different foodstuffs, preferably with recirculated heated air, said oven having a cabinet defining an oven cavity for receiving and supporting food portions to be cooked. A controllable heater and one or more blowers supply a recirculating forced flow of heated air through the oven cavity and onto food portions therein. Closures and interlocks, and an integrated control circuit, provide for operating the heater at a temperature sufficiently high to raise the temperature of the air substantially above cooking temperature and assure pyrolytic cleaning of soil from interior exposed parts of the cavity and any apparatus therein.

In one embodiment of the invention, there is a cooking chamber within the oven cavity, and including a perforate cylindrical wall having a guiding and conveying member extending along and around its interior, projecting inward therefrom, and defining a food carrying passage extending around and along said cylindrical wall. This cooking chamber is supported in the oven cavity with its cylindrical wall extending generally horizontal, and is rotatably driven in a direction such that food portions placed in the food carrying passage move therealong to an outlet from the oven cavity, thus such embodiment is capable of essentially continuous cooking operations, as more fully described in the related copending patent application.

In this embodiment, during the self-cleaning operating cycle the movement of the cooking chamber is continued, and the operation of the convection air blowers is continued, to assure thorough cleaning of all parts and the clearing of any particulate matter which may enter into the air recirculating passages.

The principal object of this invention, therefore, is to provide a self-cleaning system for convection ovens and the like, particularly ovens which operate to continuously cook various food products; to provide a pyrolytic self-cleaning system for a convection oven or the like wherein moving apparatus within the oven is operated during at least part of the self-cleaning cycle to assure this apparatus is thoroughly cleaned; and to provide a control for such a pyrolytic self-cleaning system which prevents opening any access to the oven cavity during the cleaning cycle and which prevents operation of the self-cleaning cycle unless certain parts are removed from the oven cavity.

DESCRIPTION OF THE PREFERRED EMBODIMENT

Figure 1:
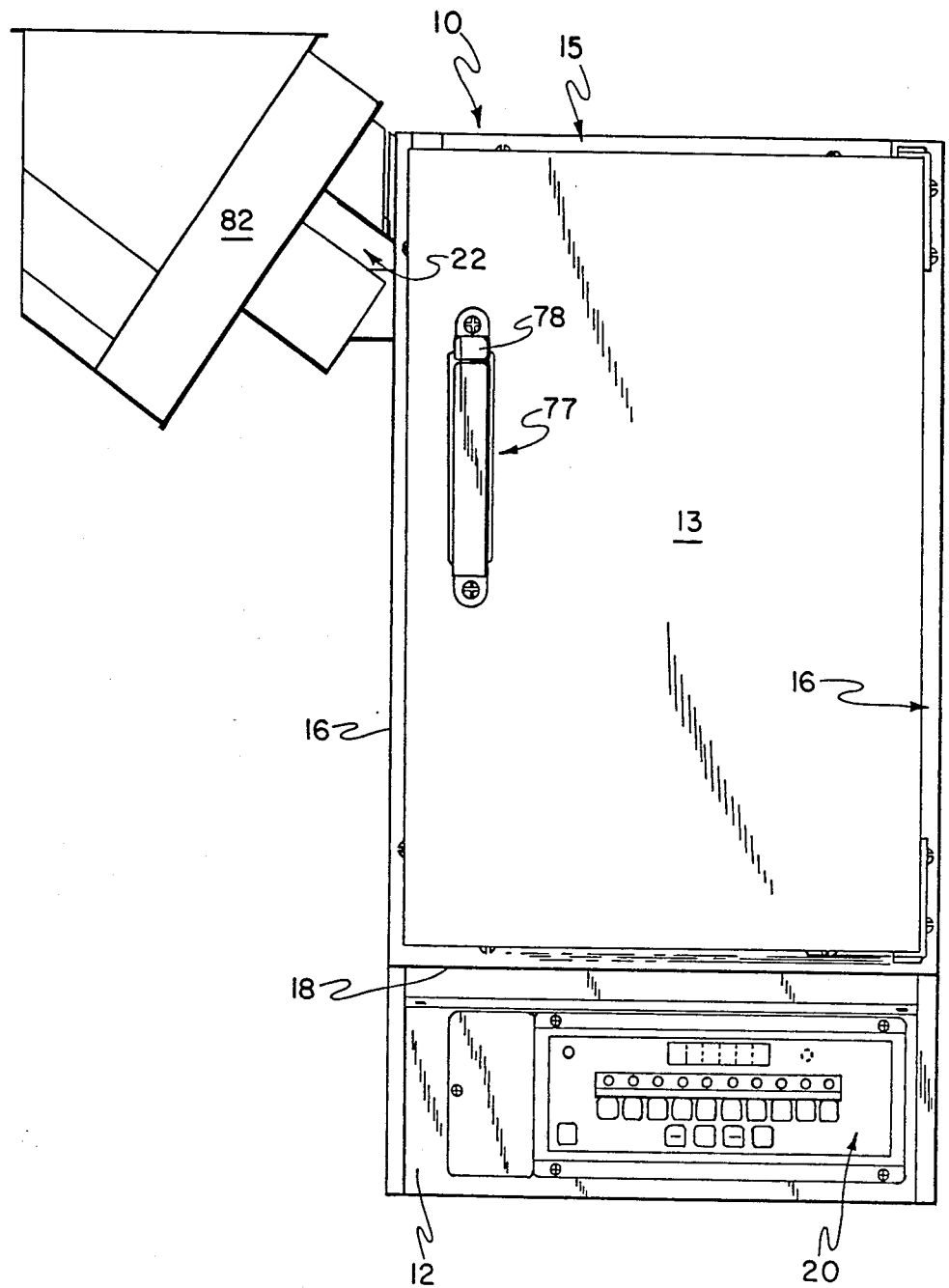
FIG. 1 is a front view of an oven constructed according to the invention.

Referring specifically to FIGS. 1-4 which illustrate the overall arrangement of a preferred embodiment which has been successfully operated, a cabinet defines an outer oven cavity 10 as well as a housing for motors, controls, and the like. The cabinet is rectangular in cross-section, of greater height than width, and has a length at least as great as its height. The cabinet is formed of a front wall 12 including a hinged normally closed door 13 (with a locking latch mechanism later described) providing access to the interior of cavity 10, a rear wall 14, a top 15, side walls 16, and a bottom 18 which is elevated above the lower edges of the front, rear and side walls to form a lower equipment compartment 20.

It will be noted that the side walls are rectangular, vertically elongated, and the front and rear walls are at least as long as the height of the side walls. In a preferred embodiment intended for restaurant kitchen use, the depth of the oven, e.g. the length of the side walls, is approximately 32 inches (81.28 cm.) to fit on a typical kitchen counter. The height of the entire cabinet is about 32 inches, and the side-to-side width is about 18 inches (456.72 cm.). These dimensions are stated solely by way of example, and without any limitation as to shape or size of an oven constructed according to the invention. In the preferred embodiment the side, top and bottom walls, and the door, are actually a composite insulated construction of several panels together with insulation and air space.

Figure 2:
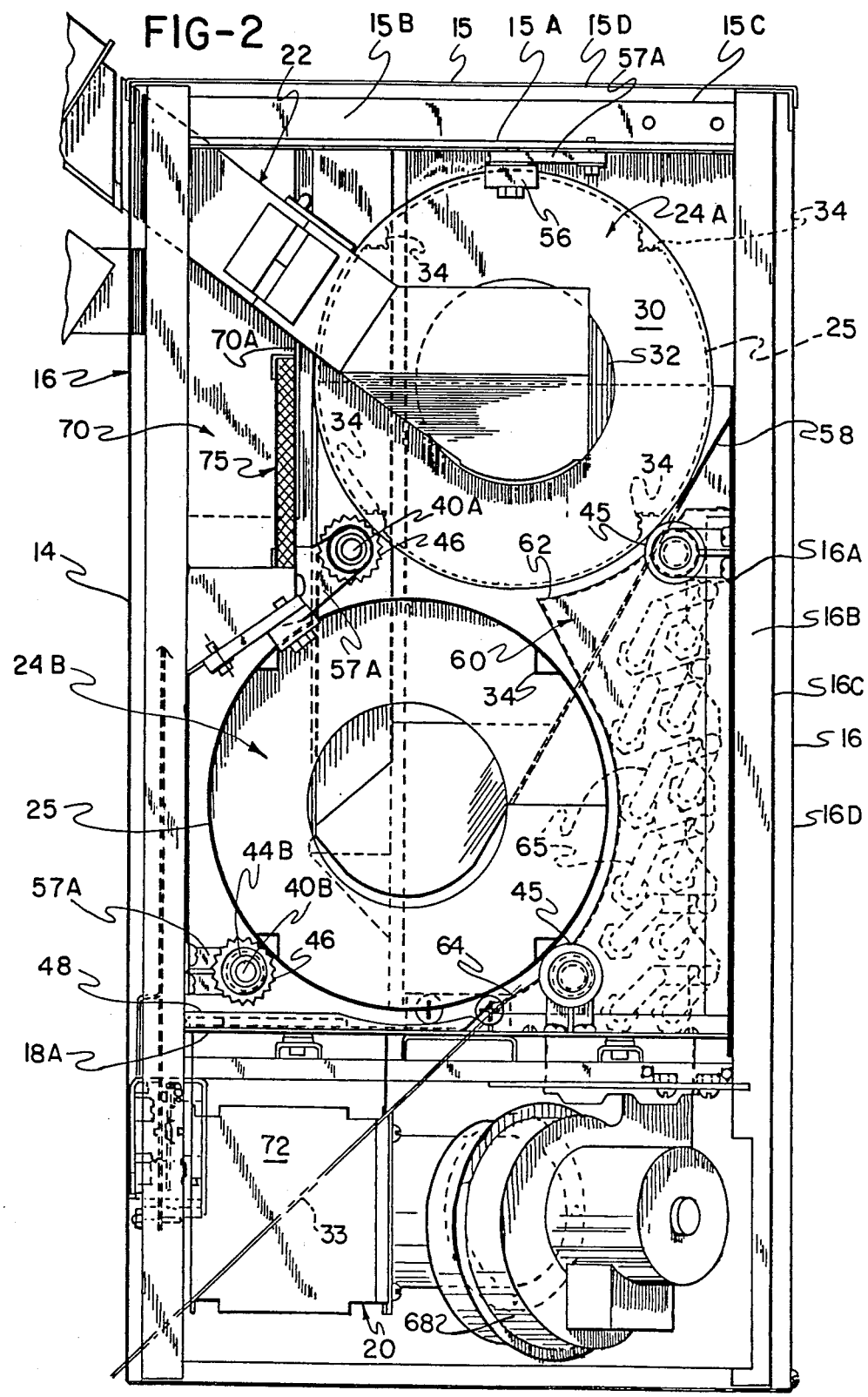
FIG. 2 is a front view with the door and front wall removed to show the layout of the parts of the oven.
Figure 3:
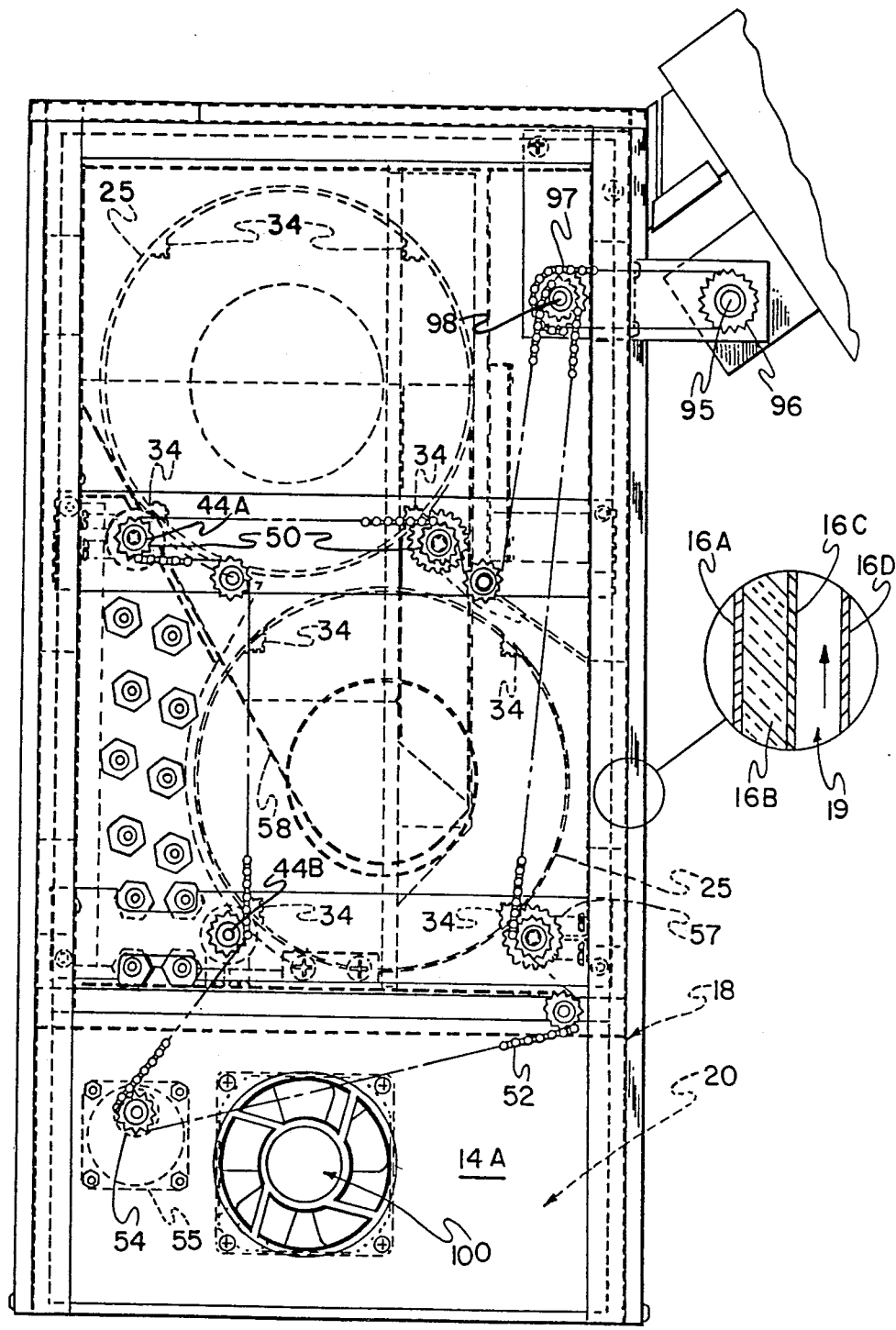
FIG. 3 is a rear view similar to FIG. 5, with the rear cabinet wall omitted.

Thus, as shown particularly in FIGS. 2 and 3, the rear wall 14, top 15 and side walls 16 comprise inner panels 14A, 15A, 16A, a layer of insulation 14B, 15B, 16B, intermediate panels 14C, 15C, 16C which surround the insulation, and outer panels 14D, 15D, 16D spaced from the intermediate panels to define a cooling air passage or jacket 19 which opens into lower compartment 20. Similarly, door 13 has inner, intermediate, and outer panels containing insulation and an air space therewithin. Bottom 18 also has multiple panels 18A, 18B and intermediate insulation. Provision is made (later described) for circulation of cooling air between panels 18C and 18D.

Adjacent front wall 12 there is an inlet chute 22 extending from the exterior of the cabinet through the left side wall 16 and an outlet chute 23 extending to the exterior of the same side wall for guiding cooked food portions out of the cabinet The outlet of chute 23 is normally open, but may be closed by a swinging cover plate or door 23D (manually operated) if the oven includes a self-cleaning features as later described.

A pair of cooking and conveying chambers 24A and 24B each include a perforate cylindrical wall 25 having a longitudinal axis 26 (FIG. 4) having an inlet end 27 and an outlet end 28. Within each cooking chamber 24 there is a conveying means in the form of an inlet baffle or plate 30 extending across the inlet end 27 and having a central opening 32 for receiving food portions to be cooked. From the periphery of baffle 30 there extends a plurality of ribs or angle bars 34 (FIGS. 3 and 4) which in turn are attached to the edge portion of a helical conveying member 35 which extends from baffle 30 along the interior of said cylindrical wall to the outlet end 28.

The helical member 35 projects inward part way toward the central or longitudinal axis of cylindrical wall 25, defining an open central passage 36 and a surrounding carrying passage 38 of helical configuration extending to the outlet end 28 of each cooking chamber 24A and 24B. The entire structure of the cooking chambers is preferably constructed of stainless steel or some equivalent material which will withstand heat in excess of 400° F. (204.4° C.) and which can be cleansed according to health code standards. The connected baffle 30, member 35 and bars 34 may be provided as a separable unit which fits closely within the cylindrical wall 25 and which Will tighten securely therein as the parts are heated in normal use. When cooled, this unit may be pulled from the outer cylindrical wall for cleaning or repair purposes Two pairs of supporting and driving shafts 40A 40B and 42A, 42B are supported in bearings 44A extending through the rear wall and forward bearings 44B carried in bracket mounted to the inner wall panels of the oven cavity. These shafts are in parallel spaced relation to each other lengthwise of oven cavity 10, at upper and lower levels therein, for holding cooking chambers 24A and 24B, respectively, in cradle-like fashion It should be noted (FIG. 2) that the two chambers 24A and 24B are supported with their longitudinal axes horizontal and offset from a vertical lengthwise plane through cavity 10, thus reducing the overall vertical dimension of the unit, and also shortening the recirculating air paths as later described Precise horizontal support of the cooking chambers is not essential, provided the functions of conveying and tumbling of the food products are achieved, however an arrangement as shown, with the axes of the chambers horizontal, does provide greater ease of construction and servicing of the oven.

Each of the shafts includes front and rear rollers 45, fixed to the shafts, which actually contact the outer surfaces of the cylindrical walls 25, for example near their inlet and outlet ends. In the embodiment illustrated, toothed drive rollers 46 on the shafts 40A and 42A (see FIGS. 2 and 3) interact with the perforations in the walls 25 for a positive drive, although friction drive of the chambers 24A and 24B may be suitable Rotation of the shafts thus imparts rotating motion to the cooking chambers about their longitudinal axes, yet allows those chambers readily to be removed from the oven cavity for cleaning, maintenance, etc. At the bottom of the oven cavity 10, resting on bottom panel 18A, is a crumb tray 48 which will collect debris such as bits of material which may work their way through the openings in chambers 24A, 24B. This tray can be easily removed to dispose of such debris.

A drive means (FIG. 3) to rotate the shafts (and thus the cooking chambers) in synchronism is provided by sprockets 50 fixed to each shaft, in the space between the intermediate rear wall panel 14 C and the outer panel. A chain 52 extends around these sprockets and around a driving sprocket 54 on a variable speed drive motor 55 mounted in compartment 20 as previously described Thus, each cooking chamber rests on the supporting and driving shafts, and it is possible to reach into the oven cavity 10 and simply lift the cooking chambers 25 out of the unit. To locate the rotatable cooking chambers, and to relieve the drive mechanism of end-wise thrust forces, retaining rollers 56 are mounted to engage the front and rear edges of the cylindrical cooking chambers. Adjacent the rear wall 14, these rollers are simply supported on fixed brackets 57; adjacent the front, brackets 57A are pivotally supported, and held in their normal position with the rollers engaging the edge of the cylinders 25A and 25B, by suitable detents (not shown).

A transfer chute 58-within cavity 10 extends from the outlet end of the upper cooking chamber 25A to the inlet end of the lower cooking chamber 25B, to guide food portions from the upper to the lower chamber. A cooking air supply manifold 60 is located extending lengthwise along a lower portion of the right side wall inner panel 16A, and occupies approximately the lower two-thirds of the space between wall panel 16A and the lower cooking chamber 24B, extending into proximity with a lower quadrant of the upper cooking chamber 24A (see FIG. 2). Manifold 60 has slot-like outlets 62 and 64 (see FIG. 12) directed against the outer surfaces of chambers 24A and 24B respectively, to direct heated air against the cylindrical walls 25 and through the perforations therein directly into and around the food portions contained in the cooking chambers.

A heating means 65, for example elongated electrical heating elements, is supported in air supply manifold 60 and extends most of the length of such manifold, to assure an ample supply of evenly heated air for the oven. Motor driven blowers 68 are mounted in the bottom compartment 20 and have their respective outlets connected into the manifold 60, so as to induce air flow over the heater 65 and through the manifold outlet slots 62 and 64 Internal baffles or partitions (not shown) ay be located within manifold 60 as needed to assist in distributing the air flow, as desired, to the respective outlets 62 and 64.

Figure 6:
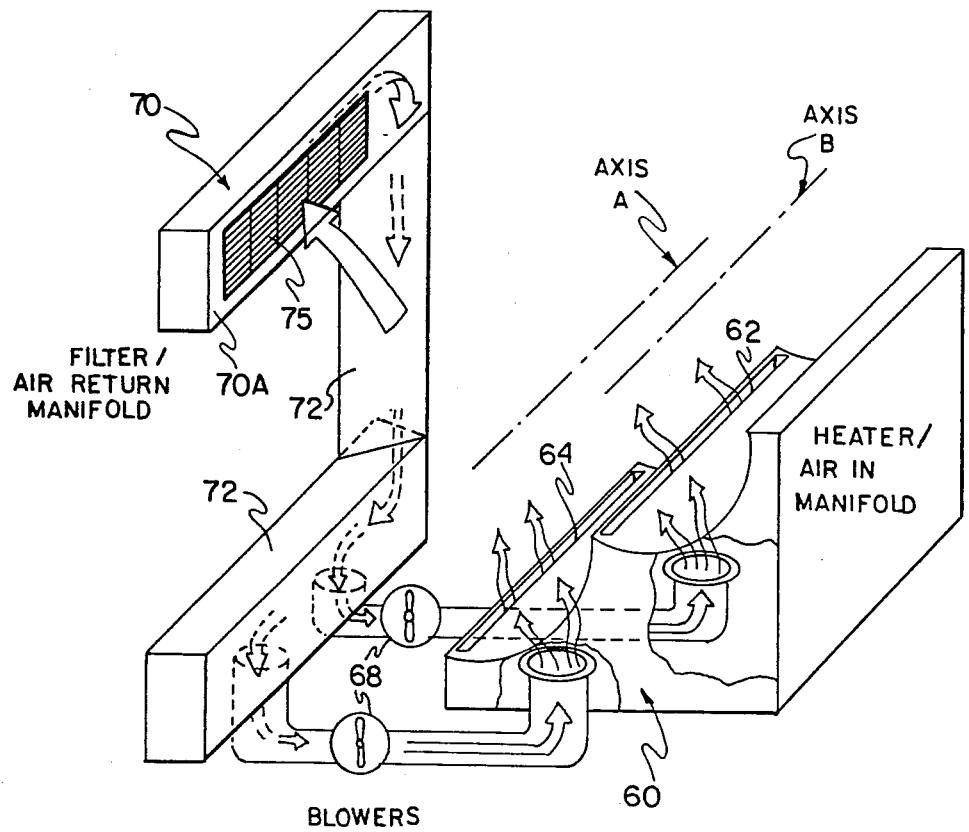
FIG. 6 is a diagrammatic perspective view showing the air circulating system of the oven.

Across cavity 10 there is a return air duct 70, also extending approximately the full length of the oven cavity, and connected by a return air manifold 72 to the inlets of the blowers 68. A filter 75 is removably mounted in the inward facing wall 70A of the return air duct, to pass and filter the recirculated air which is drawn therethrough by the blowers. The relationship of these ducts, manifolds, and the resultant forced convection air path, is illustrated in FIG. 6.

Door 13 is provided with a conventional handle and latch mechanism 77 having a thumb-operated release button 78. A spring-urged latch cooperates with a keeper on the door frame (not shown) to hold the door closed in normal operation, and to allow it to be released for opening, primarily for servicing/cleaning operations. In the self-cleaning mode (if used) later described, the release button 78 is interlocked against manual operation, to lock the door during periods when elevated temperatures exist for cleaning purposes. The door 13 need not be opened during normal cooking operations, since food portions are loaded into inlet chute 22, from whence they proceed to the upper cooking chamber 24A. The door is typically opened when it is desired to empty crumb tray 48 or to remove the cylindrical cooking chambers 24A, 24B for cleaning or repair. It should be noted that these chambers may be suitably dimensioned to fit in the wash chamber of a typical commercial ware washing machine, so they may be removed by lifting them off the supporting-driving shafts 40A, 40B and 42A, 42B and out the opened door 13, for cleansing in such a machine.

A unit such as that described so far has been successfully operated to cook a substantial variety of food products. It has been found best to maintain an oven cavity temperature in the order of 420° to 430° F. (215.5° C. to 221.1° C.) and to vary the rotational speed of the cooking chambers from about 0.25 rev./min. to about 2 re./min. In such unit the cooking chambers have a diameter of 10 inches (25.4 cm.), a length of 20 inches (50.8 cm.), and the helical member 35 is constructed with a lead of 4 inches (10.16 cm.), in other words the spacing of parts of member 35 lengthwise of the chamber at a given longitudinal line is 4 inches.

Figure 4:
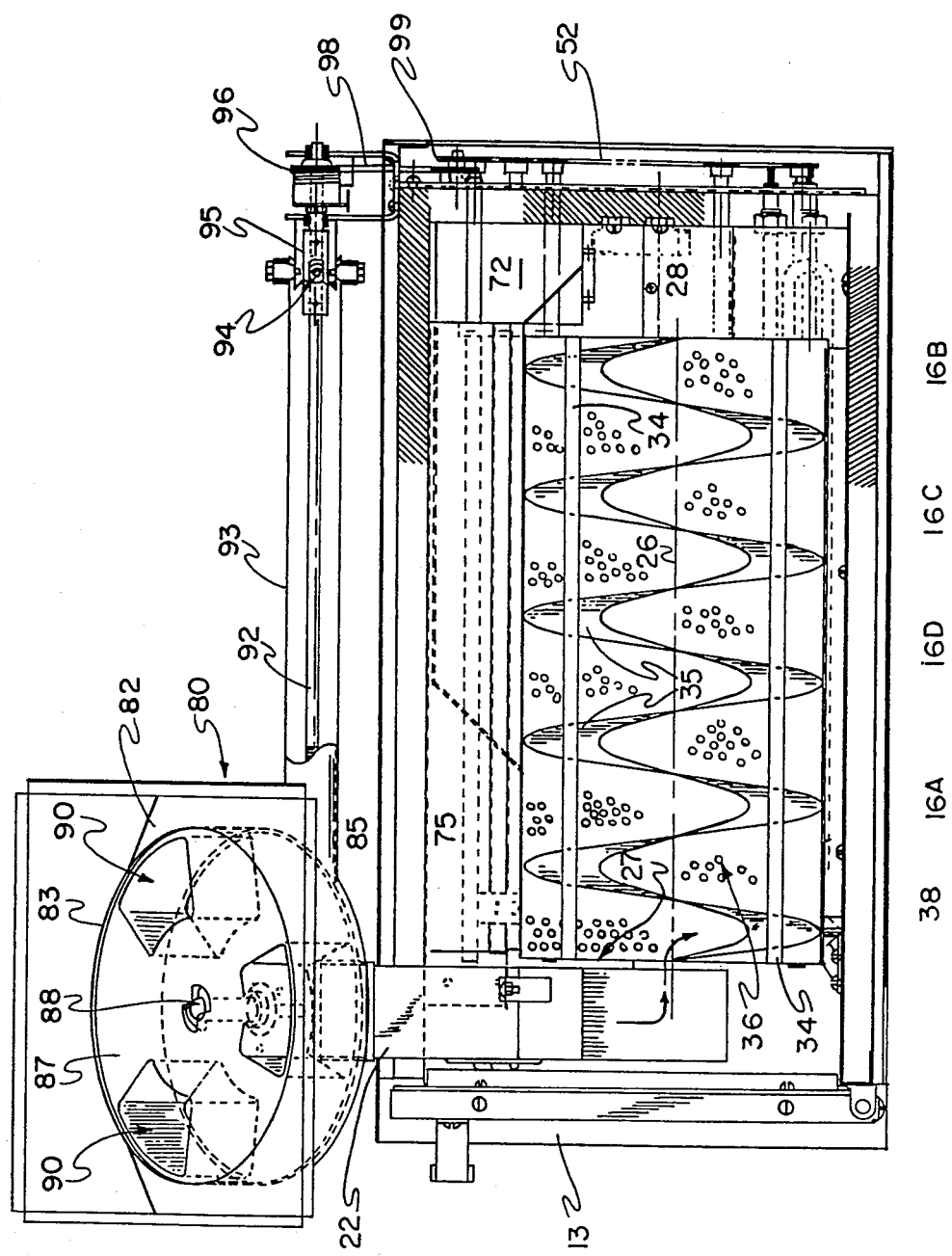
FIG. 4 is a top view with the top wall omitted, and showing a power driven feeding mechanism.
Figure 5:
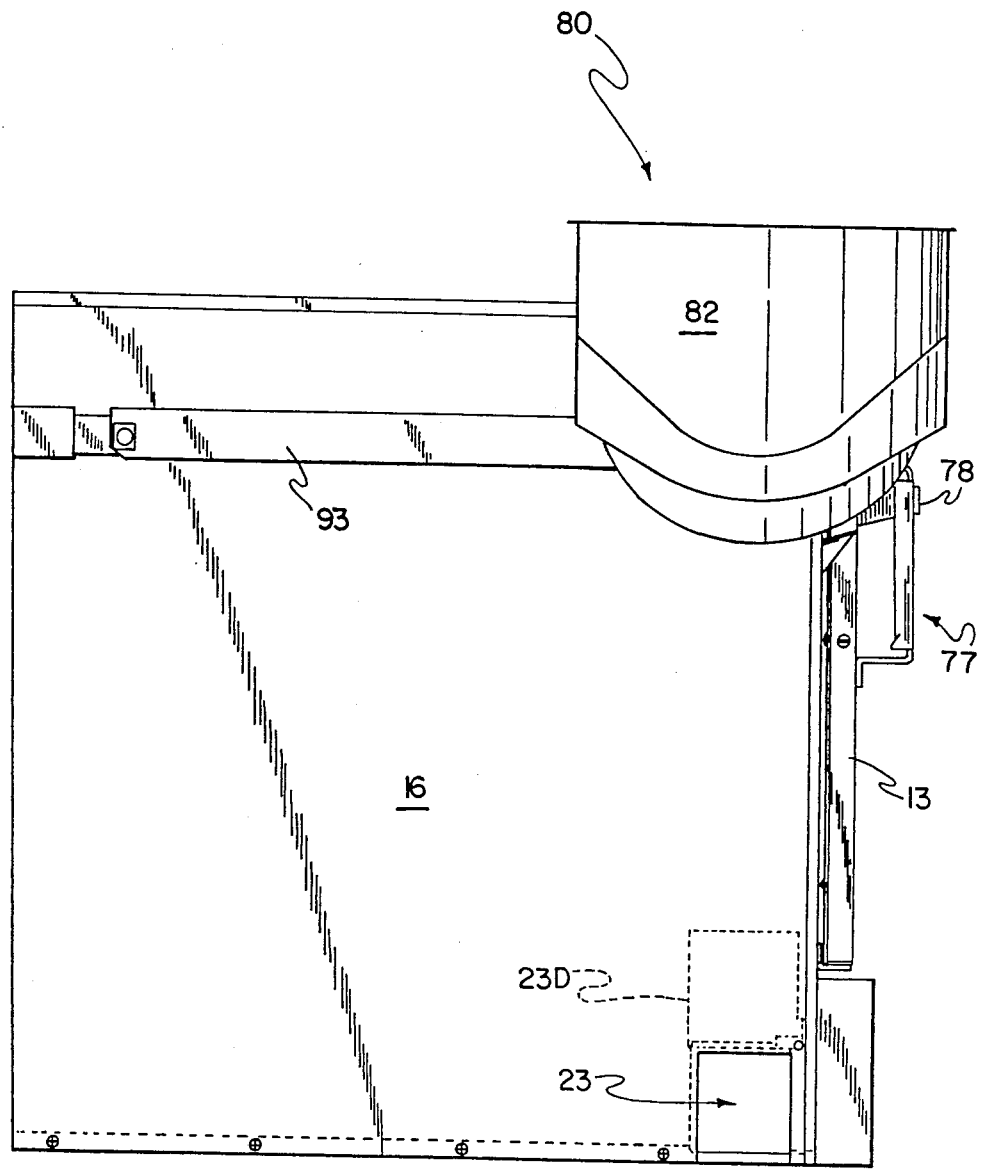
FIG. 5 is a left side view, showing the feeder and discharge port.

The optional feeder mechanism 80, shown in FIGS. 4 and 5, provides for regularly-timed deposit of units or groups of food portions into the upper cylinder 25A. The feeder includes a housing 82 having a cylindrical cavity 83 with a bottom opening (approximately square) 85 which opens into the inlet chute 22. Within cavity 83 there is a power driven three-cavity rotor member 87 which is releasably coupled to a stub shaft 88 supported in housing 82. Each of the rotor member cavities 90 can receive a desired quantity (one or more food portions) which will drop through chute 22 into chamber 25A.

The rotor member 87 is driven by a bevel gear set (not shown) from an auxiliary drive shaft 92 housed in a tubular extension 93 of the feeder housing 82. Shaft 92 is coupled through a universal joint 94 to a short drive shaft 95 which is connected to a sprocket 96 (FIG. 4) by an electrically actuatable clutch 97. Sprocket 96 is in turn connected via chain 98 to a sprocket set 99 driven from chain 52. Thus, the feeder, if used, is rotated in synchronism with the rotational drive of the cooking chambers.

Also shown in FIG. 3 is a cooling fan 100 which is mounted in, and forces air through, the lower part of rear panel 14A forming the back of compartment 20. Thus, cooling air is forced over the blowers 68 and other components housed in compartment 20, and flows upward between the intermediate and outer wall panels to assist in lowering the temperature of the outer panels.

Figure 7:
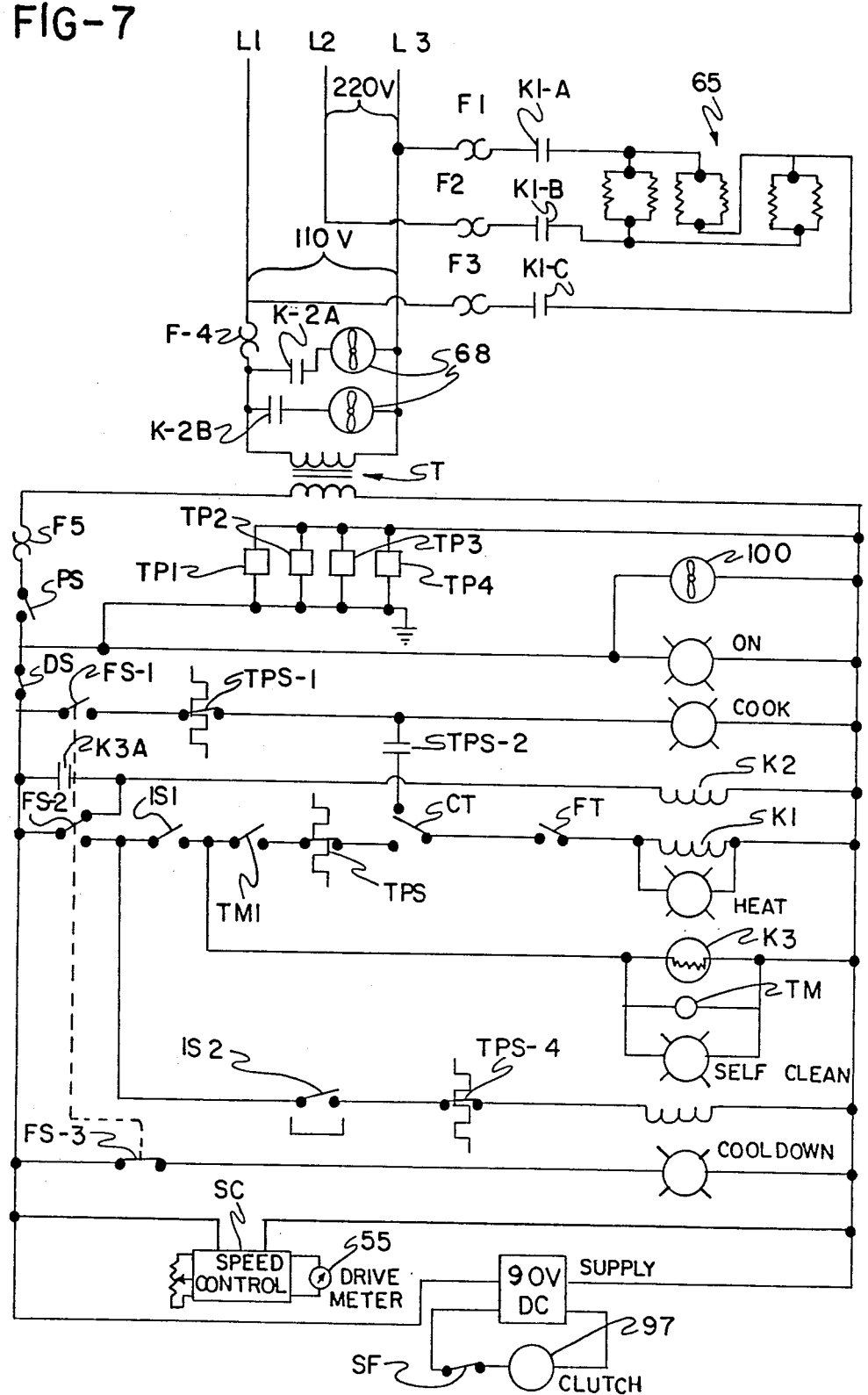
FIG. 7 is an electrical control diagram

FIG. 7 illustrates a typical control circuit for the oven described herein. The electrical power supply is shown as lines L1, L2 and L3; 240 V AC is available across lines L1 and L3 and line L2 is the common. Fuses F1, F2 and F3 are located to protect against overload in the electrical heater elements 65. Lines L1 and L3 are connected across the primary winding of a control circuit transformer T, and in parallel with the primary winding are connected the motors of the two air circulating (convection) blowers 68. A fuse F4 in line L1 protects against overload in these blower motors or the transformer primary side.

The secondary winding of transformer T supplies unregulated 120V AC to the various control circuits, relays, and to the oven chamber drive motor 55, the clutch 97 in the power drive shaft to the feeder mechanism 80, and cooling blower 100. A fuse F5 and manually operated power switch PS control the overall supply of electrical power to this circuit. Thus closing switch PS illuminates the ON indicator lamp, actuates cooling blower 100, and applies power to the control units TP1, TP2, TP3 and TP4 which are solid-state temperature responsive controls (e.g. electronic thermostats) driving circuit controlling switches TPS-1, TPS-2, TPS-3 and TPS-4. Switch TPS-1 is normally closed and opens when its control unit senses a temperature in excess of 500° F. in the oven cavity. Switch TPS-2 is normally closed, and will open when its control unit senses a preselected oven cavity temperature, in other words this controller and switch function as the cooking temperature regulator for the oven. Switch TPS-3 is normally closed and opens when its control unit senses an oven cavity temperature in excess of 1000° F., during the pyrolitic cleaning function. Switch TPS-4 is normally closed and opens when the oven cavity temperature exceeds 600° F.; it is used, as later explained, to keep the door 13 locked when the temperature exceeds that value.

A function selector switch FS has three different switch parts, FS-1 which is the "cook" cycle selection, FS-2 which is the "clean" cycle selection, and FS-3 which is the "cool down" cycle selection. These three switches are interlocked, mechanically or electronically, such that only one can be effective. Thus, the operator can select one of these three functions to the exclusion of the others.

There are also a number of normally open mechanically closed switches which provide interlocks that require a certain placement of various parts of the oven. Switch DS requires that the door 13 be closed before power can be applied to any of the control circuits which initiate one of the three functions. Switch CT is closed only when the crumb tray 48 is properly in position in the oven cavity. Switch FT is closed only when air filter 75 is properly in position. Switch IS-1 is a normally open switch which is closed when the door 23D at the outlet chute 23 is closed. Switch IS2 is closed when door 13 is closed or in the closed/locked position for cleaning, and open when door 13 is open.

A speed controller SC provides power to the motor 55 and also controls its rotational speed, which in turn varies the rotational speed of cooking chambers 24A and 24B. A DC power supply CV provides power to energize clutch 97 in the auxiliary drive to the feeder mechanism. A normally open interlock switch SF is closed only when the feed housing 82 is properly mounted, so otherwise the drive to the feed mechanism is interrupted at clutch 97.

When the oven has been powered up, switch FS is set to the "cook" function, FS1 is closed, and the control unit TP-2 is set to the desired cooking temperature; it is assumed that air filter 75 and crumb tray 48 are in position, and the main door 13 is closed, but the outlet cover door 23D is open.

The ON indicator will be energized showing power is applied to the oven. Since switch FS is in the "cook" position, the COOK indicator also will be energized, and will remain so unless the control unit TP1 senses oven temperature in excess of 500° F. and opens its switch TPS1. Power also will be applied through switch TPS2 of the temperature controller and switches CT and FT, to the coil of contactor relay K1 and the HEAT indicator which is wired in parallel with that coil. This results in closing contacts K1A-K1C, applying power to the heater means (coils) 65. Since switch FS2 is in the position shown (it transfers only when the "clean cyle" is selected), power is also supplied to coil K2 of the blower motor relay, its contacts K2A and K2B are closed, and flow of convection air begins in the oven cavity.

Power is also applied to the speed control SC, which in turn powers motor 55 to rotate at the chosen speed, and if the feed housing is in place, switch SF is closed and clutch 97 is energized to drive the feeder mechanism rotor 87. When the HEAT indicator first extinguishes, as the controller TP2 opens its switch TPS2 at the selected temperature, this is an indication that the oven is heated to the desired temperature and product can now be fed into the feed mechanism (or manually into the inlet 22 if the feed mechanism is not used). Residence time of food product in the oven will be determined by the speed selected for motor 55.

Moving the selector switch to the "cool down" mode opens FS1 and closes FS3. This deenergises the heater control contactor K1, actuates the COOL DOWN indicator, and leaves the blowers 68 operating and the drive motor 55 running while the oven cools. The end of this period can be determined by an operator, at which time the switch PS is opened to remove power from the entire control circuit, stopping the blowers and drive motor.

To actuate the "cleaning" mode, for pyrolytic cleaning of the oven, switch FS is moved to the "clean" position and FS2 transfers to its normally open contact. The crumb tray 48 is removed and switch CT transfers to its normally open contact. Also, the door 23D is closed across the outlet opening, closing interlock switch IS1, and thus placing the heater control relay coil under the control of the high temperature controller switch TPS3 and a timer switch Ail. The temperature limit switch TPS4 is closed, assuming oven temperature below 600° F., and the door lock solenoid DL is energized to lock the latching mechanism 77 for door 13 in the closed position So long as the oven temperature remains above 600° F. during a cleaning cycle, TPS4 is open and closing door interlock switch IS2 cannot energize the door lock solenoid DL to permit the door to be unlocked and opened.

Power is applied through FS2 and IS1 to the CLEAN indicator, to the driver TM of a cleaning period timer (e.g. two hour time out), and to the coil of an interrupter type relay K3 which, when energized, will close its contacts K3A for a short period, then open them, then reclose. The contacts K3A are wired into the circuit for powering the coil of blower relay K2, and the timer contacts TM1 are wired in series with switch TPS3, interlock switch IS1, and the selector switch FS2.

Therefore, the blowers 68 will be cycled on and off during the cleaning cycle, and that cycle will last for the timer duration. The temperature controller switch TPS3 functions as an over temperature safety to prevent heating above a preselected upper cleaning temperature, for example 1000° F. When the timer completes its period, power to the heater contactor relay coil K1 is interrupted, the heaters turn off, but the blowers continue to cycle and the motor 55 continues to rotates chambers 24A and 24B It should be noted that during the self cleaning cycle, the cooling fan 100 continues to operate and to move cooling air through interwall space of the oven cabinet.

While the method herein described, and the forms of apparatus for carrying this method into effect constitute preferred embodiments of this invention, it is to be understood that the invention is not limited to this precise method and forms of apparatus, and that changes may be made in either without departing from the scope of the invention, which is defined in the appended claims.

What is claimed is:

1. A continuous cooking oven capable of rapidly cooking different foodstuffs with recirculated hot air, said oven comprising, a cabinet defining an oven cavity including a cooking chamber therein and having an inlet chute for food portions to be cooked and an outlet chute for cooked food portions,, means for sealing said inlet and outlet chutes during an oven cleaning cycle, said cooking chamber including a cylindrical wall having a longitudinal axis and having an inlet end and an outlet end, and conveying member extending along and projecting inward from an interior of said cylindrical wall defining a food carrying passage extending to the outlet end of said cooking chamber, means rotatably supporting said cooking chamber in said oven cavity with said inlet end adjacent said inlet chute and said outlet end discharging to said outlet chute, drive means for rotating said cooking chamber at a predetermined speed, means in said oven cavity supplying a forced flow of heated air along the length of said cylindrical wall into said cooking chamber and onto food portions therein including heater means for heating air to cooking temperatures, means in said oven cavity drawing the heated cooking air from said cooking chamber and recirculating it to said air supplying means, cycle control means for operating said oven in a self-cleaning cycle including operating said heater means at a temperature/sufficiently high to raise the temperature of/the air substantially above cooking temperature and assure pyrolytic cleaning of soil from interior exposed parts of said cavity and said cooking chamber, said cycle control means being connected to actuate said drive means during a cleaning cycle.

2. An oven as defined in claim 1, wherein
   said supporting and drive means include a plurality of shafts mounted extending parallel to each other generally horizontally in said oven cavity and cradling said cooking chamber,
   means on at least one of said shafts for imparting to said cylindrical wall rotation about its longitudinal axis,
   said cooking chamber being removable from said cavity by lifting it away from said shafts, and
   said conveying member is a helical wall removably mounted in said cooking chamber for cleaning purposes.

3. An oven as defined in claim 2, wherein there are a pair of said cooking chambers supported on said shafts in said oven cavity along vertically spaced generally horizontal axes, the inlet end of the lower cooking chamber being generally located below the outlet end of the upper cooking chamber and means guiding food portions from the outlet of the upper chamber into the inlet of the lower chamber, means for supplying food portions into said inlet chute and and thence into said inlet end of the upper cooking chamber and means for guiding cooked food portions from said outlet end of said lower cooking chamber into said outlet chute, said drive means being coupled to both of said cooking chambers whereby food portions progress at a predetermined rate through both cooking chambers.

4. A continuous cooking oven capable of rapidly cooking different foodstuffs with recirculated heated air, said oven comprising, a cabinet defining an outer oven cavity including an inlet chute for food portions to be cooked and an outlet chute for cooked food portions, means for sealing said inlet and outlet chutes during an oven cleaning cycle, a cooking and conveying chamber including a cylindrical wall having a longitudinal axis and having an inlet end and an outlet end, and a conveying member extending along and projecting inward from an interior of said cylindrical wall defining a food carrying passage extending to the outlet end of said cooking chamber, a pair of substantially horizontal shafts mounted in parallel spaced relation to each other along said oven cavity for cradling and driving said cooking chamber, drive means connected to rotate said shafts and thereby to rotate said cooking chamber about its longitudinal axis, a cooking air manifold supported in said oven cavity and having an outlet for supplying heated cooking air into said cooking chamber substantially along the length thereof, a blower and a heater associated with said oven cavity and connected to supply air heated to cooking temperature at a substantial pressure into said manifold, and air return ducts adjacent said cooking chamber and substantially along the length thereof and arranged to draw heated air from said cooking chamber and recirculate it to said blower, means for actuating said locking means and operating said heater at a substantially elevated temperature to heated the interior of said cavity to a temperature sufficient to cause pyrolytic cleaning of soil from the interior surfaces of said cavity and from said cooking chamber.

* * * * *